April 11, 1950          A. J. TROYER          2,503,976
SEED POTATO CUTTER
Filed Nov. 13, 1947          3 Sheets-Sheet 1
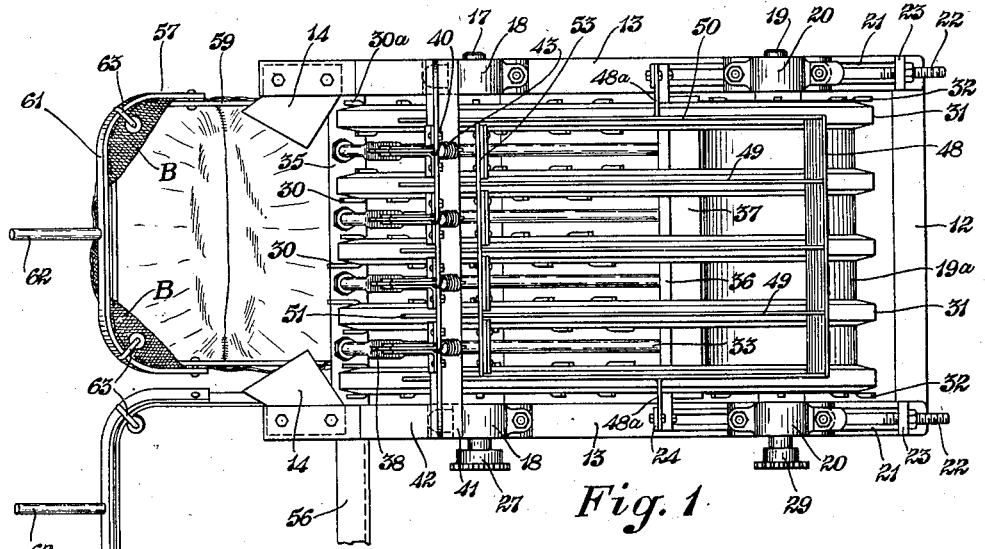
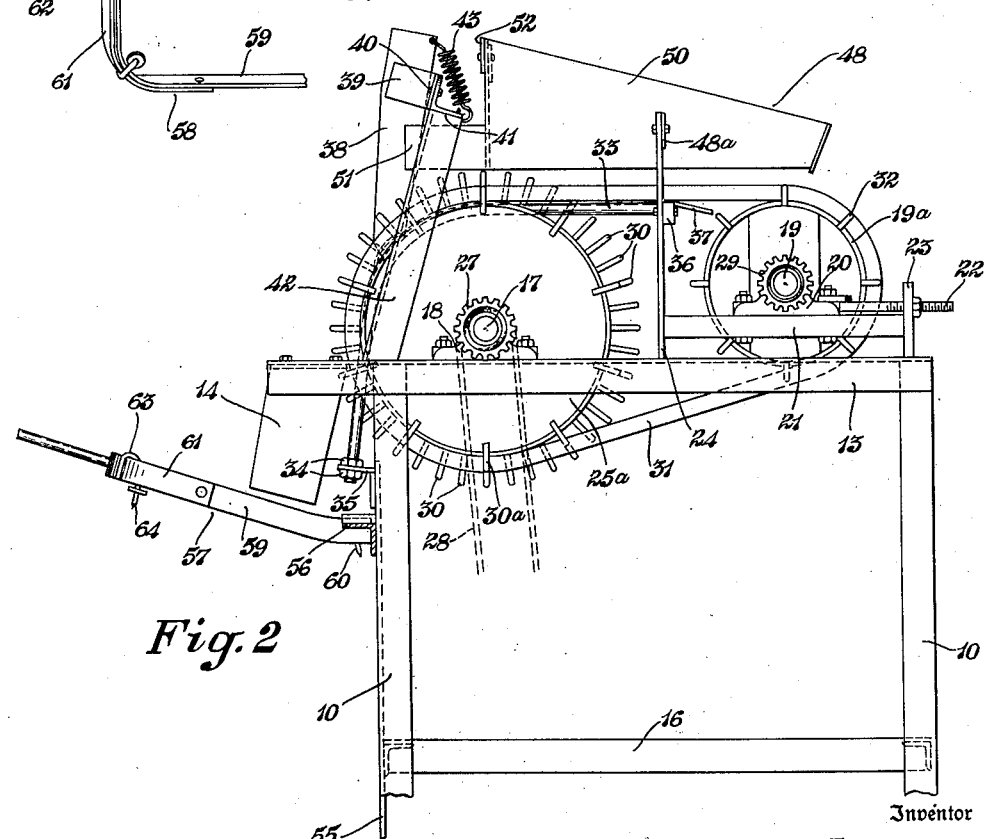
Inventor
Abner J. Troyer
By Frease and Bisley
Attorneys April 11, 1950     A. J. TROYER     2,503,976
SEED POTATO CUTTER
Filed Nov. 13, 1947     3 Sheets-Sheet 2
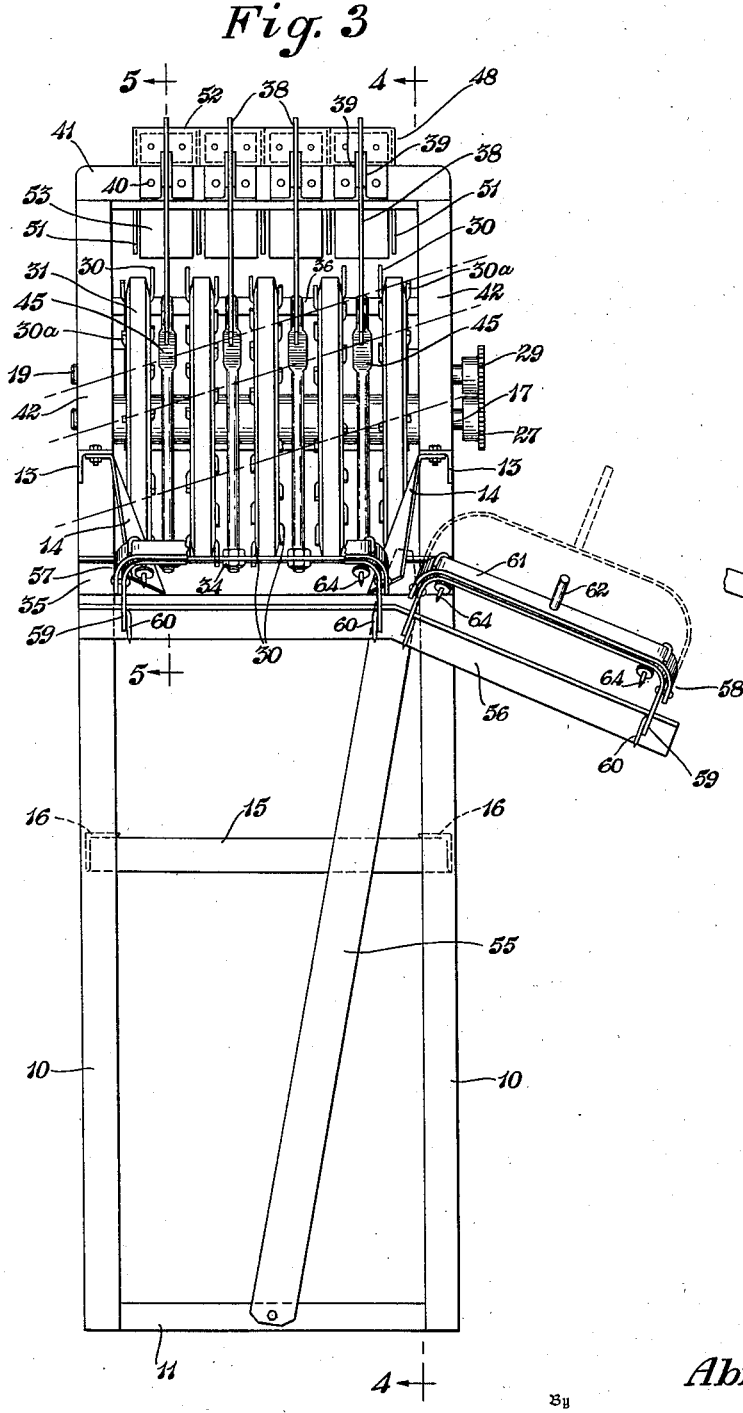
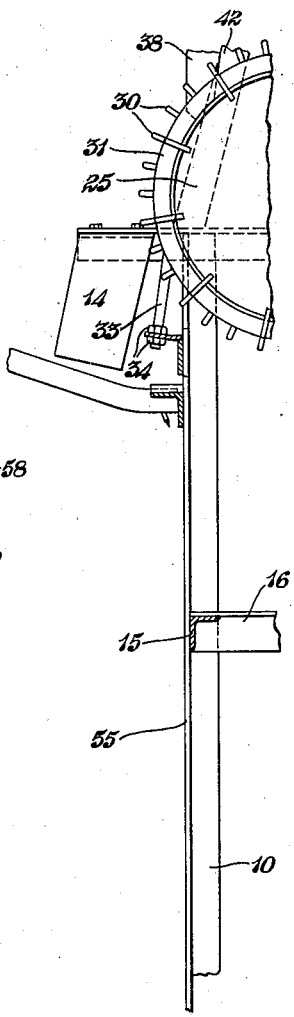
Inventor
Abner J. Troyer
By
Attorneys April 11, 1950     A. J. TROYER     2,503,976
SEED POTATO CUTTER Filed Nov. 13, 1947     3 Sheets-Sheet 3

Inventor
*Abner J. Troyer*
By *Frease and Bishop*
Attorneys

Patented Apr. 11, 1950

2,503,976

UNITED STATES PATENT OFFICE 2,503,976

SEED POTATO CUTTER

Abner J. Troyer, Smithville, Ohio

Application November 13, 1947, Serial No. 785,652

8 Claims. (Cl. 146—164)

The invention relates generally to potato cutting machines, and more particularly to a novel machine for cutting seed potatoes in readiness for planting.

Prior potato cutting machines have had a number of disadvantages. Such machines have utilized hoppers for feeding the potatoes into the machine, but in many cases the potatoes pile up and jam in the hopper. It has been proposed to use belts having fingers for feeding the potatoes to cutting knives, but when the potatoes pile up in the hoppers, the fingers do not feed them properly to the cutting knives. Moreover, in certain prior machines the cutting knives are rigidly mounted, so that if a stone or piece of foreign material is carried to a knife, the knife becomes damaged and the machine may become jammed to cause damage to other parts.

It is an object of the present invention to provide an improved potato cutting machine having novel means for feeding potatoes in a plurality of single lines and at regular intervals to cutting knives.

Another object is to provide a novel potato cutting machine having moving belts for feeding potatoes from a hopper to fingers secured at intervals on the pulleys driving the belts.

Another object is to provide a novel potato cutting machine having a plurality of cutting knives and a rotary wheel for each knife provided at intervals with fingers for carrying the potatoes past the knives, the fingers on the several wheels being staggered so that the potatoes are cut successively by the several knives.

A further object is to provide improved potato cutting machine having novel cutting knives arranged in the paths of moving potatoes and being mounted in such manner as normally to cut the potatoes but so as to be thrown out of the way when engaged by a foreign article.

A still further object is to provide an improved potato cutting machine having novel means for holding the knives normally in cutting position and for cooperating with the knife to kick the cut potatoes away from the knife at the completion of the cut.

Finally, it is an object of the present invention to provide a novel potato cutting machine adapted for cutting a large number of potatoes in a minimum amount of time with a minimum amount of power required, and to incorporate all the foregoing objectives in a simple, compact and economical construction.

These and other specifications are accomplished by the parts, constructions, arrangements and combinations which comprise the present invention, the nature of which is set forth in the following general statement, and a preferred embodiment of which is set forth in the following descriptions and illustrated in the accompanying drawings, and which is particularly and descriptively pointed out and set forth in the appended claims forming part hereof.

In general terms, the potato cutting machine of the present invention may be described as including a hopper for receiving potatoes and a plurality of inverted V belts traveling side-by-side under the hopper and adapted for carrying a line of potatoes between each pair of belts out from under the hopper, the driving pulleys for the belts being provided with fingers for engaging behind successive potatoes, and the fingers being staggered on the respective pulleys, a substantially upright knife blade for each line of potatoes positioned at the front of the drive pulleys and between each pair of belts, and means for detachably holding the bottom portions of the knives in position to cut the moving potatoes successively and to be thrown out of cutting position by a foreign article located in the moving line.

Referring to the drawings forming part hereof, in which a preferred embodiment of the invention is shown by way of example:

Fig. 1 is a plan view of the improved potato cutting machine of the present invention;

Fig. 2 is a side view thereof, the lower part of the frame being broken away;

Fig. 3 is a front elevational view thereof;

Fig. 4 is a fragmentary view as on line 4—4, Fig. 3;

Similar numerals refer to similar parts throughout the drawings.

Figures 5, 6, 7:
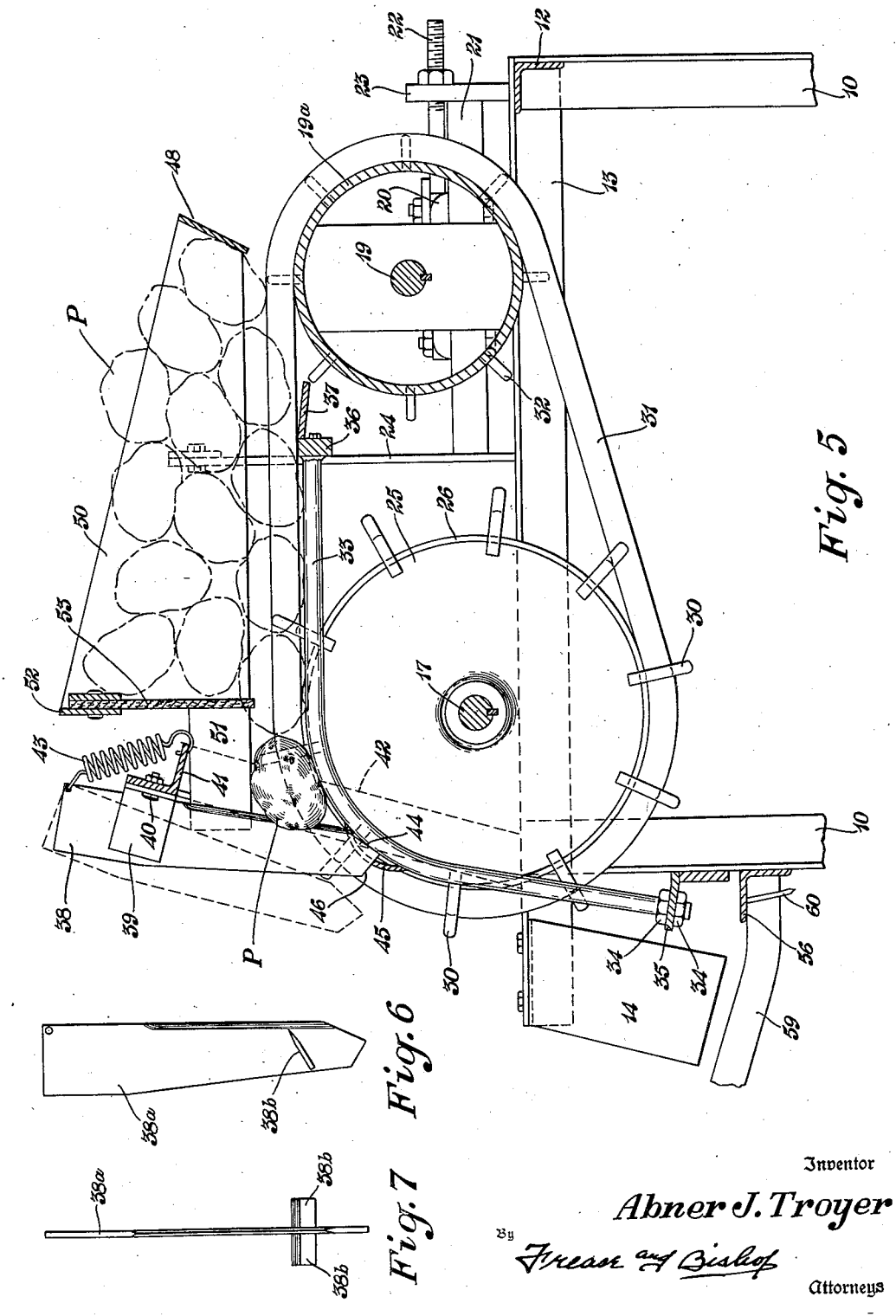
Fig. 5 is enlarged fragmentary sectional view as on line 5—5, Fig. 3.
Fig. 6 is a detached side elevation of a modified form of knife blade.
Fig. 7 is a front view thereof looking toward the cutting edge.

The improved potato cutter preferably includes a rectangular frame which may be formed of structural steel angles, there being four angles 10 at the corners of the frame. Horizontally disposed angles 11 connect the bottom ends of the corner angles to form a base, and a horizontally disposed angle 12 connects the top ends of the rear corner angles. Preferably, side angles 13, connecting the front and rear corner angles, project forwardly of the front corner angles to provide supports for laterally opposite deflector plates 14.

Intermediate their top and bottom ends, the corner angles 10 are preferably connected by front and rear angles 15 and side angles 16, and the motor drive means for the potato cutter may suitably be supported on these angles 15 and 16. All the angles making up the frame may be connected to each other, as by welding, to provide a solid and rigid framework for supporting the potato cutting machine proper.

The drive shaft 17 of the machine is preferably mounted transversely of said side top angles 13 adjacent the front corner angles 10, and may be journaled in suitable bearings 18 supported on said side angles 13. Preferably, the driven shaft 19 is journaled in bearings 20 located adjacent the rear corner angles 10, and said bearings 20 are slidably supported on short longitudinal angles 21 spaced above and located directly over said side angles 13.

Means for adjusting the driven shaft 19 toward or away from drive shaft 17, for regulating tension in the belts driven by shaft 17, preferably includes adjusting bolts 22 connected at their forward ends to bearings 20 and threaded through upright posts 23 secured on the rear ends of side members 13. As shown, the short angles 21 are secured, as by welding, at their rear ends to the posts 23 and at their front ends to upright posts 24 secured on intermediate portions of side angles 13.

The drive shaft 17 has fixed thereon a plurality of laterally spaced pulleys 25 having cylindrical rim flanges 26 each adapted for carrying the wide side or surface of a so-called V belt, so that the belt is inverted with respect to its usual position on a V pulley. The driven shaft 19 has fixed thereon a laterally extending cylindrical drum 19a for carrying the rear ends or loops of the belts carried by the laterally spaced pulleys 25.

A sprocket 27 is fixed on the outer end of drive shaft 17, and is adapted to be connected by means of a chain 28 or the like, indicated in dotted lines in Fig. 2, to a driving motor which may be supported on the intermediate angles 15 and 16. The driven shaft 19 may also be provided on one end with a sprocket 29 which may be used to connect the shaft 19 to a conveyor or the like for conveying potatoes to the machine.

Each of the pulleys 25 on the drive shaft 17 has a series of circumferentially spaced fingers 30 secured as by welding to opposite edges of its rim flange 26 and projecting radially outward therefrom. The end pulleys 25a have similar series of shorter fingers 30a on the outer edges of their rim flanges. The fingers on opposite edges of each rim flange serve to form a groove or guide for retaining one of the V belts 31 which wrap around the pulleys 25 and are driven thereby. The drum 29 has at its ends series of fingers 32 similar to the fingers 30a for retaining the outer belts 31 on the drum.

Thus the fingers 30 and 30a serve to maintain the belts in accurate spaced-apart position while keeping them on the respective drive pulleys 25 and 25a. The belts 31 are spaced apart a distance calculated to provide a moving trough for receiving and conveying potatoes of a desired size for planting. This size may be approximately two inches in diameter with some variation above and below that figure. When potatoes of this approximate size are dropped onto the upper runs of the belts 31 they are supported between tapered sides of two adjacent belts 31 which form a moving trough for the moving potatoes, and conveyed forwardly by the belts toward the front drive pulleys 25. As the potatoes reach the tops of the pulleys 25 they move in front of opposed pairs of the fingers 30, which are so spaced circumferentially that each pair of opposed fingers engages behind a potato and moves it forwardly and downwardly with the adjacent belts supporting the potato.

It will be seen that the five belts 31 accordingly provide four moving troughs of potatoes and that the fingers 30 perform two functions: (1) the fingers on opposite sides of each pulley 25 form guides for the belts, and (2) the opposed fingers on adjacent pulleys provide means for positively engaging behind each potato which is carried between adjacent belts.

Referring to Fig. 3, it is seen that the opposed pairs of fingers 30 on adjacent pulleys are horizontally opposite each other so that each pair engages a potato, and as indicated by the inclined dot-dash lines the fingers of the several pulleys are staggered with respect to each other so that the potatoes in the lines or troughs are not in alignment with each other transversely of the belts. The purpose of this misalignment is to provide for cutting the potatoes in the several lines successively rather than simultaneously so as to reduce vibration and improve the balance of the machine while operating.

Beneath each trough formed by adjacent belts 31 a longitudinal guide rod 33 is provided, having a rear horizontal portion with its front portion following the curve of the belts 31 downwardly at the front of the pulleys 25. The lower front ends of the rods 33 are adjustably secured as by nuts 34 to a plate 35 extending transversely of the front of the frame and secured to the corner angles 10 thereof. The rear ends of the rods 33 are preferably secured as by welding to a cross bar 36 which is connected to the upright posts 24. The horizontal portions of the rods 33 provide supports for any of the potatoes which extend below the belts carrying the potatoes, and the front curved portions of the rods 33 provide supports for the potatoes during the cutting operation. As best shown in Fig. 5, a plate 37 is secured to cross bar 36 and extends rearwardly therefrom, for supporting potatoes between the rods 33 and the rear drum 19a.

The knife blades 38, which cut the potatoes as they are moved forwardly and downwardly by the fingers 30, are mounted in substantially upright positions one in front of each trough formed between adjacent belts, with their cutting edges directly in front of the moving lines of the potatoes. The upper portion of each knife blade 38 is frictionally held by two side plates 39 forming a forwardly opening slot in which the knife blade is slidably received. The side plates 39 are secured at their rear ends as by bolts 40 to a transversely extending angle 41 located above the pulleys 25 and supported in that position by upwardly extending angles 42 solidly welded or otherwise secured to the side angles 13 of the frame. Means for yieldingly holding or urging each knife blade downwardly preferably includes a helical spring 43 connecting the upper rear corner of the knife blade to the rear flange of the transverse angle 41.

The bottom rear edge 44 of each knife blade is beveled rearwardly upwardly so as to rest on and be substantially tangent to the curved portion of the guide rod 33 immediately below, as best shown in Fig. 5. The bottom end of the knife blade is slidably received in a slotted curved plate 45 welded or brazed to the curved portion of the rod 33, normally for retaining the knife blade in position while it cuts through a potato. At the same time, the bulge or curve of the plate 45 serves to kick the cut halves of the potato outwardly away from the fingers as the potato passes under the knife.

The bottom front edge 46 of the knife is beveled or angled rearwardly downward and rests in the bottom of the slot in plate 45. The angle of the beveled edge 46 is such that during the cutting of the knife blade successively through the potatoes in the moving line, the bottom of the knife blade 38 will be retained by the spring 43 in the slotted plate 45, but if a piece of foreign material, such as a stone or piece of wood finds its way in the moving line of potatoes, the increased force of its engagement with the knife blade will immediately kick out the blade to the dotted position shown in Fig. 5 and allow the foreign article to pass without damaging or breaking the blade.

A hopper indicated generally at 48 is supported over the upper runs of the belts 31 preferably by side plates 48a secured to the tops of upright posts 24, and the hopper has partitions 49 therein for guiding the potatoes in single lines into the troughs formed by adjacent belts 31. Preferably the upper edges of the partitions 49 and of the side walls 50 of the hopper are sloped rearwardly downward, so that when potatoes are dumped into the hopper they will tend to roll backwardly and prevent piling up or jamming of potatoes on the top of the hopper.

Each of the side walls 50 and partition walls 49 of the hopper have forwardly extending divider strips 51 for insuring that the potatoes remain in single lines until they reach the knives 38. A cross piece 52 extends across the front upper ends of the side walls 50, and partition walls 49 and between each adjacent pair of walls 49 and 50 a flexible strip 53 of leather or the like is secured to the cross piece 52 and extends downwardly between the dividers 51. These strips 53 are long enough to frictionably engage the top of each potato as it moves forwardly in a single line, and to exert enough restraining force to prevent jamming or piling up of the potatoes in the several troughs.

A bag holder is provided at the front of the frame of the machine for holding a bag in open position to receive the cut potatoes as they fall outwardly and downwardly from the knives 38. As indicated in Figs. 1 and 3, this bag holder is preferably of a dual type having two side by side holder frames so that an empty bag can be mounted on the one frame while a bag previously mounted on the other frame is being filled. The bag holder is preferably supported on the upper end of a supporting leg 55 pivoted at its lower end to the bottom base angle 11 of the frame, and being connected at its upper end to a transverse angle 56 which projects laterally outward in opposite directions from the supporting strip 55.

As shown in Fig. 4, as the leg 55 oscillates, it engages one or the other of the corner angles 10 to position one of the other bag holder frames beneath the cutting knives 38. In the position of Fig. 3, the leg 55 is swung to the right to engage the right corner angle 10, which brings the left bag holder frame 57 under the knives while the other bag holder frame 58 is positioned to one side. The two bag holder frames are identical in construction so that only the frame 57 need be described.

The frame 57 includes an inner U-shaped strap 59 having its inner ends secured to the transverse angle 56 with downwardly extending prongs 60 located at the connections between the angle 56 and the inner ends of the U. An outer U-shaped strap 61 is pivoted to intermediate portions of the sides of the inner strap 59 and is adapted to swing downwardly around the outer portion of the inner strap 59, a handle 62 being provided on the outer strap 61. At the curved corners of the outer strap prongs 63 are secured, and these prongs extend inwardly over the inner strap and then downwardly and terminate in pointed ends 64.

In order to mount the upper end of a bag in open position on the bag holder, the rear side of the mouth of the bag is first hooked around the rear prongs 60 and then the opposite side of the mouth are pulled upwardly over the front curved portions of the inner U strap so that corner portions B of the bag extend over and across the curved corners of the inner frame, as indicated in Fig. 1. The outer U-shaped portion 61 of the frame is then swung downwardly until the prongs 64 pierce the corner portions B of the bag, and the bag is then securely held in the frame 57 or 58 until filled with the cut potatoes. In releasing the bag the outer frame 61 is first raised to the dotted position indicated in Fig. 3, whereupon the mouth of the bag is quickly disengaged from the prongs 60 and 64.

The modified form of knife blade 38a shown in Figs. 6 and 7 is identical with the knife blades 38, except that transverse blades 38b are welded or brazed to the sides of the blade 38a near its lower end so as to cut the potatoes in quarters instead of halves if desired. The blades 38b are inclined rearwardly upward toward the cutting edge for cutting each of the two halves cut by the blade 38a into two substantially equal pieces. The rods 33 may be adjusted slightly at their lower ends by the nuts 34 to adjust the blades 38b, as required.

In the operation of the improved potato cutting machine, the potatoes P are dumped into the hopper 48, and may be continuously fed into the hopper by a loading conveyer. As the potatoes fall by gravity through the hopper, they are divided into single lines by the partitions 49 and dropped into troughs formed by the adjacent moving belts 31. The potatoes being dumped onto the top of the hopper tend to roll rearwardly along the top edges of the walls 49 and 50 thereof so as to prevent excessive piling up of the potatoes on top of the hopper.

As the potatoes are moved forwardly in single lines by the belts 31, they are each frictionally engaged by the bottom of a flexible strip 53 which retards their movement slightly and tends to space the potatoes slightly apart in the moving line as they emerge from the hopper. At this point each potato is engaged by a pair of the fingers 39 and forced past a knife blade 38 so as to cut rapidly entirely through the potato, and as the cut is completed, the curved plate 45 serves to kick the potato halves outwardly from the knives. From the knives the potato halves fall into the bag held in open position by the bag holder 57 or 58, and the deflector plates 14 aid in guiding the cut potatoes into the bag.

The improved machine provides for cutting seed potatoes rapidly in four moving lines, and the staggering or misalignment of the fingers laterally provides for cutting all of the potatoes successively so as to improve the balance and reduce the vibration of the machine to a minimum. The potatoes are all cut entirely through in a minimum amount of time and with a minimum amount of power, and the knife blades may be used for relatively long periods of time because they are not damaged appreciably by foreign articles, due to the novel way of mounting the knives for being kicked out of the way by foreign articles. However, the knife blades are quickly and easily replaced when desired merely by disengaging the springs 43 and lifting the knives out of the side plates 39 and curved slotted plates 45.

The novel arrangement of the hopper, moving belts and fingers provides for feeding potatoes constantly in rapid succession to the knives without involving any piling up or jamming of the potatoes while in or passing out of the hopper.

The slight angularity of the knife blades 38 rearwardly from the top down tends to force the potatoes firmly into the V grooves between the conveyor belts at the point of cutting, and as this action follows through during the cutting action, each potato is at all times forced downwardly until the cut halves leave the knife.

In the foregoing description, certain terms have been used for brevity and clearness but no unnecessary limitations are to be implied therefrom beyond the requirements of the prior art, because such words are used for descriptive purposes and are intened to be broadly construed. Moreover the scope of the present invention is not intended to be limited to the exact details of construction disclosed and described.

The new and useful constructions and devices of the present invention, together with reasonable mechanical equivalents thereof obvious to those skilled in the art, are defined in the appended claims.

I claim:

1. In a potato cutting machine, a drive shaft, a pair of pulleys fixed on said drive shaft, a driven shaft spaced laterally from said drive shaft, a pair of pulleys fixed on said driven shaft, endless V-belts positioned around said pulleys and adapted to convey potatoes positioned between the belts toward the drive pulleys, a plurality of radially projecting fingers arranged at intervals around said drive pulleys, pairs of said fingers on opposite sides of said belts adapted to engage behind potatoes carried by said belts, and a substantially upright knife blade positioned in the path of the potatoes at the front of said drive pulleys.

2. In a potato cutting machine, a drive shaft, a pair of pulleys fixed on said drive shaft, a driven shaft spaced laterally from said drive shaft, a pair of pulleys fixed on said driven shaft, endless V-belts positioned around said pulleys and adapted to convey between the belts toward the drive pulleys, a plurality of radially projecting fingers arranged at intervals around said drive pulleys, pairs of said fingers on opposite sides of said belts adapted to engage behind potatoes carried by said belts, a substantially upright knife blade positioned in the path of the potatoes at the front of said drive pulleys, and means for detachably holding the bottom portion of said knife blade normally for cutting entirely through said potatoes and for being thrown out of cutting position by engagement with a foreign article of greater hardness.

3. In a potato cutting machine, a drive shaft, a pair of pulleys fixed on said drive shaft, a driven shaft spaced laterally from said drive shaft, a pair of pulleys fixed on said driven shaft, endless belts positioned around said pulleys and adapted to convey potatoes positioned between the belts toward the drive pulleys, a plurality of radially projecting fingers arranged at intervals around said drive pulleys, pairs of said fingers on opposite sides of said belts being adapted to be engaged behind potatoes carried by said belts, a substantially upright knife blade positioned in the path of the potatoes at the front of said drive pulleys, a cutter plate, said plate having a slot detachably receiving and supporting the bottom portion of said knife blade in position normally for cutting through said potatoes as they pass downwardly over the cutter plate, and spring means attached to the top rear end of said knife blade urging said top portion rearwardly downward for throwing the bottom end of the blade forwardly out of said slot when the blade is struck by a hard object.

4. In a potato cutting machine, a drive shaft, a plurality of pulleys fixed on said drive shaft, a driven shaft spaced laterally from said drive shaft, a plurality of pulleys fixed on said driven shaft, endless belts positioned around said pulleys and adapted to convey potatoes positioned between the belts toward said drive pulleys, a hopper positioned above the upper runs of said belts, partitions in the hopper for guiding potatoes into single lines between adjacent belts, a plurality of radially projecting fingers arranged at intervals around said drive pulleys, pairs of said fingers on opposite sides of said belts being adapted to engage behind potatoes carried by said belts, and a substantially upright knife blade positioned in the path of each line of potatoes at the front of said drive pulleys.

5. In a potato cutting machine, a drive shaft, a plurality of pulleys fixed on said drive shaft, a driven shaft spaced laterally from said drive shaft, a plurality of pulleys fixed on said driven shaft, endless belts positioned around said pulleys and adapted to convey potatoes positioned between the belts toward said drive pulleys, a hopper positioned above the upper runs of said belts, partitions in the hopper for guiding potatoes into single lines between adjacent belts, a plurality of radially projecting fingers arranged at intervals around said drive pulleys, pairs of said fingers on opposite sides of said belts being adapted to engage behind potatoes carried by said belts, a substantially upright knife blade positioned in the path of each line of potatoes at the front of said drive pulleys, and means of detachably holding the bottom portion of each knife blade normally for cutting entirely through said potatoes and for being thrown out of cutting position by engagement with a foreign article of greater hardness.

6. In a potato cutting machine, a drive shaft, a plurality of pulleys fixed on said drive shaft, a driven shaft spaced from said drive shaft, a pair of pulleys fixed on said driven shaft, endless belts positioned around said pulleys and adapted to convey potatoes positioned between the belts toward said drive pulleys, a hopper positioned above the upper runs of said belts, partitions in the hopper for guiding potatoes into single lines between adjacent belts, a plurality of radially projecting fingers arranged at intervals around said drive pulleys, pairs of said fingers on opposite sides of said belts being adapted to engage behind potatoes carried by said belts, a substantially upright knife blade positioned in the path of each line of potatoes at the front of said drive pulleys, a cutter plate for each knife blade, said plate having a slot detachably receiving the bottom portion of said knife blade in position normally for cutting through said potatoes, and spring means attached to the top of each knife blade urging its top portion rearwardly downward.

7. In a potato cutting machine, a plurality of endless belts, drive and driven pulleys carrying the belts in spaced-apart relation for carrying potatoes between the belts, circumferentially spaced fingers on said drive pulley for engaging behind the individual potatoes carried by the belts, and a substantially upright knife blade at the front of said drive pulleys in the path of said potatoes, means slidably supporting the lower end of said knife blade, and resilient means urging the upper end of said blade rearwardly downward for throwing the lower end of the blade forwardly away from its support when the blade is struck by a hard object.

8. In a potato cutting machine having a frame, a plurality of endless belts, drive and driven pulleys carrying the belts in spaced-apart relation for carrying potatoes between the belts, circumferentially spaced fingers on said drive pulley for engaging behind the individual potatoes carried by the belts, and a substantially upright knife blade at the front of said drive pulleys in the path of said potatoes, a slotted plate on the frame receiving the bottom end of said knife blade normally for holding it in cutting position, and a spring connecting the frame to the top rear end of the blade urging it rearwardly downward for throwing the bottom end out of the slotted plate when the blade is struck by a hard object.

ABNER J. TROYER.

REFERENCES CITED

The following references are of record in the file of this patent:

UNITED STATES PATENTS

| Number | Name | Date |
|---|---|---|
| 532,228 | Brown | Jan. 8, 1895 |
| 1,299,198 | Low et al. | Apr. 1, 1919 |
| 1,909,462 | Foon | May 16, 1933 |
| 2,226,071 | Oldenburg | Dec. 24, 1940 |
| 2,299,567 | Cummings | Oct. 20, 1942 |